US009045307B2

(12) United States Patent
Sugizaki et al.

(10) Patent No.: US 9,045,307 B2
(45) Date of Patent: Jun. 2, 2015

(54) SHEET SORTING DEVICE AND SHEET SORTING METHOD

(75) Inventors: Yoshiaki Sugizaki, Shizuoka-ken (JP); Hiroyuki Taki, Shizuoka-ken (JP); Hidetoshi Yokochi, Shizuoka-ken (JP); Isao Yahata, Shizuoka-ken (JP); Takahiro Kawaguchi, Shizuoka-ken (JP); Ken Iguchi, Shizuoka-ken (JP); Kikuo Mizutani, Shizuoka-ken (JP); Hiroyuki Tsuchihashi, Shizuoka-ken (JP); Chiaki Iizuka, Shizuoka-ken (JP); Toshiaki Oshiro, Shizuoka-ken (JP); Hiroyuki Hazu, Shizuoka-ken (JP); Yoichi Yamaguchi, Shizuoka-ken (JP); Hiroyuki Sugiyama, Shizuoka-ken (JP); Yuichi Saito, Shizuoka-ken (JP)

(73) Assignees: Kabushiki Kaisha Toshiba, Tokyo (JP); Toshiba TEC Kabushiki Kaisha, Tokyo (JP)

( * ) Notice: Subject to any disclaimer, the term of this patent is extended or adjusted under 35 U.S.C. 154(b) by 160 days.

(21) Appl. No.: 13/484,191

(22) Filed: May 30, 2012

(65) Prior Publication Data

US 2012/0307314 A1 Dec. 6, 2012

Related U.S. Application Data

(60) Provisional application No. 61/495,269, filed on Jun. 9, 2011, provisional application No. 61/493,395, filed (Continued)

(51) Int. Cl.

| | |
|---|---|
| ***H04N 1/00*** | (2006.01) |
| ***B65H 29/62*** | (2006.01) |
| ***G03G 21/00*** | (2006.01) |

(52) U.S. Cl.

CPC ...... *B65H 29/62* (2013.01); *B65H 2301/33312* (2013.01); *B65H 2301/51121* (2013.01); *B65H 2301/544* (2013.01); *B65H 2511/512* (2013.01); *B65H 2513/42* (2013.01); *G03G 21/00* (2013.01)

(58) Field of Classification Search

CPC . G06F 3/1205; G06F 3/1255; G06F 11/3013; G06F 3/1296; G06Q 30/04; H04L 51/18

USPC ............................ 358/402; 347/179; 399/405

See application file for complete search history.

(56) References Cited

U.S. PATENT DOCUMENTS

| | | | | |
|---|---|---|---|---|
| 5,545,381 A | | 8/1996 | Iida et al. | |
| 5,574,538 A | * | 11/1996 | Takahashi et al. | 399/71 |

(Continued)

FOREIGN PATENT DOCUMENTS

| | | |
|---|---|---|
| JP | 2001-117426 | 4/2001 |
| JP | 2002-037500 | 2/2002 |

(Continued)

OTHER PUBLICATIONS

English Translation of Office Action dated Mar. 4, 2014, filed in corresponding Japanese Patent Application No. 2012-125372.

(Continued)

*Primary Examiner* — Martin Mushambo

(74) *Attorney, Agent, or Firm* — Patterson & Sheridan, LLP

(57) ABSTRACT

According to an embodiment, a first discharging unit and a second discharging unit discharge a sheet. A first conveying path extends from a scanning unit to the first discharging unit. A second conveying path branches off from the first conveying path at a branch point of the first conveying path and extends to the second discharging unit. A conveying member discharges the sheet to the first discharging unit when a discharging destination of the sheet is the first discharging unit, and the conveying member makes part of the sheet project from the first conveying path to the first discharging unit, locates an upstream tip end of the sheet in a sheet conveying direction, at a position downstream in the sheet conveying direction from the branch point, and conveys the sheet to switchback to the second conveying path, when the discharging destination of the sheet is the second discharging unit.

19 Claims, 14 Drawing Sheets

Related U.S. Application Data on Jun. 3, 2011, provisional application No. 61/494,861, filed on Jun. 8, 2011, provisional application No. 61/494,864, filed on Jun. 8, 2011, provisional application No. 61/494,851, filed on Jun. 8, 2011, provisional application No. 61/503,569, filed on Jun. 30, 2011.

(56) References Cited

U.S. PATENT DOCUMENTS 6,393,232 B1 * 5/2002 Osari et al. .................... 399/82
2008/0063453 A1 * 3/2008 Huang et al. ................. 400/188
2011/0292153 A1 * 12/2011 Sadowara et al. ............ 347/179

FOREIGN PATENT DOCUMENTS

JP 2006-133550 5/2006
JP 2009-091105 4/2009

OTHER PUBLICATIONS

Office Action dated Jun. 12, 2014, filed in Chinese Patent Application No. 201210167928.X, with English translation.

* cited by examiner

SHEET SORTING DEVICE AND SHEET SORTING METHOD

CROSS-REFERENCE TO RELATED APPLICATION

This application is based upon and claims the benefit of priority from U.S. provisional application 61/493,395, filed on Jun. 3, 2011; U.S. provisional application 61/494,851, filed on Jun. 8, 2011; U.S. provisional application 61/494,861, filed on Jun. 8, 2011; U.S. provisional application 61/494,864, filed on Jun. 8, 2011; U.S. provisional application 61/495,269, filed on Jun. 9, 2011; U.S. provisional application 61/503,569, filed on Jun. 30, 2011; the entire contents of which are incorporated herein by reference.

FIELD

Embodiments describe herein relate generally to techniques for reducing the size of a sheet sorting device.

BACKGROUND

An erasing device capable of erasing an image on a sheet is conventionally known. With this erasing device, the image is erased and then the erased surface of the sheet is scanned by a scanning unit. A conveying path branches off at a position downstream in sheet conveying direction from the scanning unit. A first branch path is connected to a first discharging unit, and a second branch path is connected to a second discharging unit. When it is determined that there is no unerased part on the erased surface, the erasing device sorts the sheet from the scanning unit to the first branch path and discharges the sheet to the first discharging unit. When it is determined that there is an unerased part on the erased surface, the erasing device sorts the sheet from the scanning unit to the second branch path side and discharges the sheet to the second discharging unit.

Since such an erasing device is provided at places like an office, there is a need for size reduction of the device.

DETAILED DESCRIPTION

According to an embodiment, a device generally includes a paper feeding unit, a scanning unit, a first discharging unit, a second discharging unit, a first conveying path, a second conveying path, a branching member, and a conveying member. The paper feeding unit feeds a sheet. The scanning unit scans an image on the sheet. The first discharging unit and the second discharging unit discharge the sheet. The first conveying path extends from the scanning unit to the first discharging unit. The second conveying path branches off from the first conveying path at a branch point of the first conveying path and extends to the second discharging unit. The branching member is located at the branch point to sort the sheet, moving from a side of the first discharging unit to the branch point, to the second conveying path. A conveying member is located between the first discharging unit and the branching member, the conveying member discharges the sheet to the first discharging unit when a discharging destination of the sheet is the first discharging unit, and the conveying member makes part of the sheet project from the first conveying path to the first discharging unit, locates an upstream tip end of the sheet in a sheet conveying direction from a side of the reading unit to the side of the first discharging unit, at a position downstream in the sheet conveying direction from the branch point, and conveys the sheet to switchback to the second conveying path through the branching member, when the discharging destination of the sheet is the second discharging unit.

Hereinafter, embodiments will be explained with reference to the drawings.

(First Embodiment)

Figure 1:
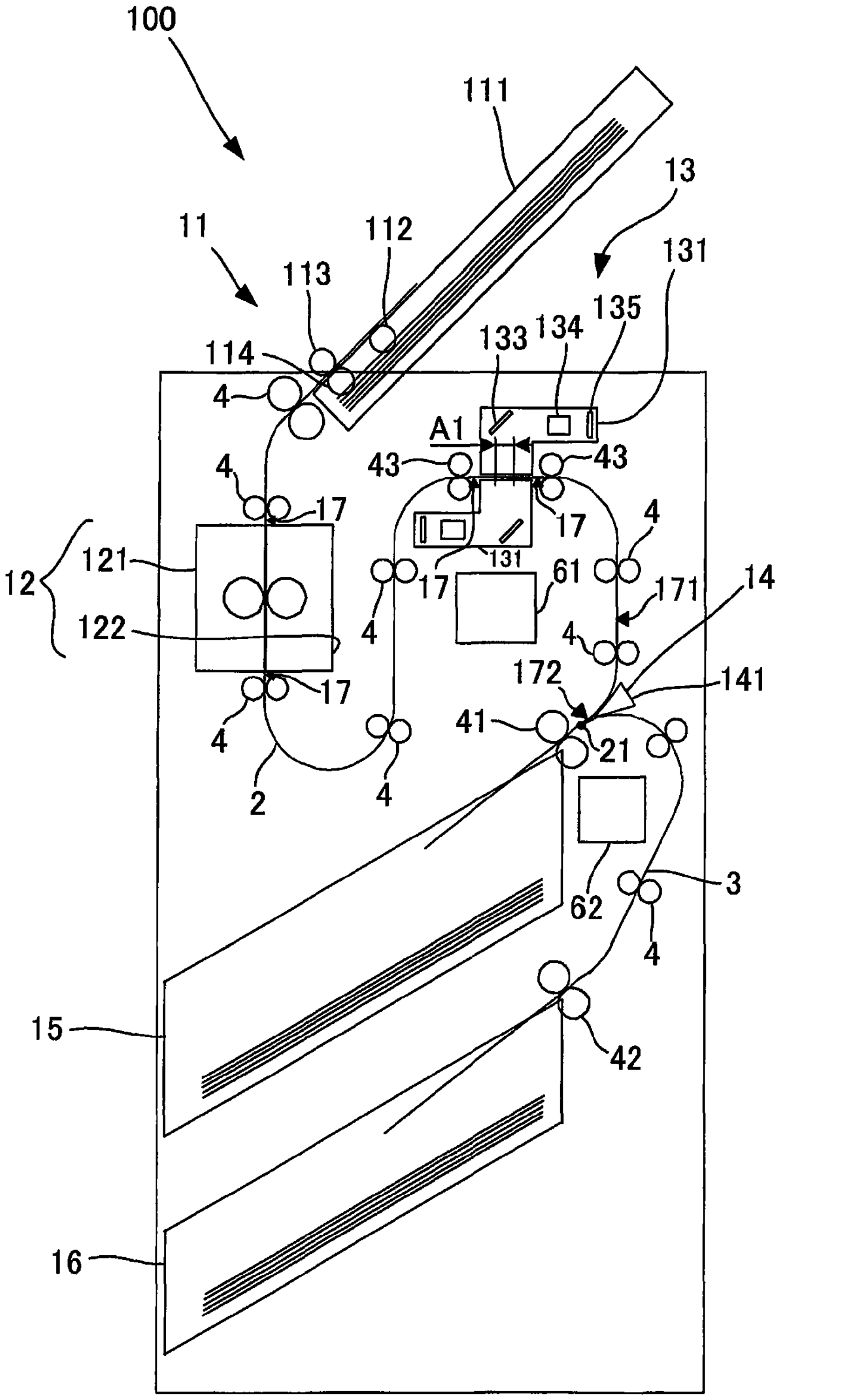
FIG. 1 is a view showing the structure of an erasing device according to a first embodiment.

FIG. 1 shows the structure of an erasing device 100 (sheet sorting device).

The erasing device 100 subjects a sheet, having an image formed thereon, to erasing processing in order to erase the image on the sheet. In this embodiment, it is assumed that the image on the sheet is formed by a powder decolorable toner or liquid decolorable ink to be decolorized when heated. According to this embodiment, the image on the sheet is erased by heating the sheet. However, the image may be erased by irradiating the sheet with light such as near-infrared light to decolorize the image on the sheet. Also, the image on the sheet may be erased by immersing the sheet in a process liquid and separating the non-decolorable toner from the sheet.

The erasing device 100 includes a paper feeding unit 11 (paper feeding means), an erasing unit 12 (erasing means), a scanning unit 13 (scanning means), a first conveying path 2, a second conveying path 3, conveying rollers 4, a branching member 14 (branching means), a first discharging unit 15, a second discharging unit 16, sensors 17, a first drive source 61 and a second drive source 62.

The paper feeding unit 11 includes a paper feeding tray 111, a pickup roller 112, a supplying roller 113, and a separating roller 114. The paper feeding tray 111 receives the sheet on which an image is formed by a decolorable colorant. The sheet may have various sizes including A4-R, A4 and LTR. According to this embodiment, it is assumed that the A4-R sheet, among the sheets to be erased, has the greatest length in sheet conveying direction. According to this embodiment, it is assumed that the A4-R sheet is conveyed from the paper feeding unit 11. The pickup roller 112 carries the sheet in the paper feeding tray 111 to the first conveying path 2. The supplying roller 113 and the separating roller 114 are paired with each other and, when the pickup roller 112 carries a plurality of sheets to the first conveying path 2, separate one sheet from the plurality of sheets to be carried to the first conveying path 2.

The erasing unit 12 includes two erasers 121, 122 provided along the first conveying path 2. In the erasing unit 12, the erasers 121, 122 abut against and heat both surfaces of the sheet, so that the image on the both surfaces of the sheet can be erased at a time.

The scanning unit 13 includes two scanners 131, 132 provided along the first conveying path 2.

Each of the scanners 131, 132 receives light in an imaging element 135 through a mirror 133 and a lens 134, the light progressing from a scanning region A1 opposing to the sheet into the scanners 131, 132. The imaging element 135 may be a contact image sensor (CIS), a charge coupled device image sensor (CCD), or a complementary metal oxide semiconductor (CMOS). The scanning unit 13 scans the image on the both surfaces of the sheet at a time after the erasing processing. Scanned image data is stored in a memory 53 or hard disk drive 54 (HDD) (FIG. 2) and used for determination whether an unerased part exists on the sheet or not. According to this embodiment, image data before the erasing processing is stored in the memory 53 so that the image recorded on the sheet can be restored after the erasing processing.

The first conveying path 2 extends from the paper feeding unit 11 to the first discharging unit 15, with a branch point 21 in its middle. From the upstream side in the sheet conveying direction, there are the erasing unit 12 and the scanning unit 13 along the first conveying path 2, between the paper feeding unit 11 and the branch point 21. The first conveying path 2 linearly extends downward from the scanning unit 13 side, tilts downward and leftward in FIG. 1 to reach the first discharging unit 15. The branch point 21 is located at the point where the first conveying path 2 tilts downward and leftward.

The second conveying path 3 extends from the branch point 21 to the second discharging unit 16. The second conveying path 3 bends upward and rightward from the branch point 21, and tilts downward and leftward to reach the second discharging unit 16.

The distance from the scanning region A1 of the scanning unit 13 to the branch point 21 in the sheet conveying direction is smaller than the length in the sheet conveying direction (297 mm) of the A4-R sheet (297 mm×210 mm) having the greatest length in the sheet conveying direction among the sheets to be erased. Also, the distance from the branch point 21 to a first discharging roller 41 in the sheet conveying direction is smaller than the length in the sheet conveying direction of the A4-R sheet having the greatest length in the sheet conveying direction among the sheets to be erased.

A plurality of conveying rollers 4 are provided along the first conveying path 2 and the second conveying path 3. Hereinafter, the conveying roller 4 for discharging the sheet to the first discharging unit 15 is referred to as the first discharging roller 41 (switchback roller, conveying member, conveying means), and the conveying roller 4 for discharging the sheet to the second discharging unit 16 is referred to as a second discharging roller 42, out of the conveying rollers 4. The first discharging roller 41 is located between the branch point 21 and the first discharging unit 15 along the first conveying path 2, and conveys the sheet to switchback from the first discharging unit 15 side to the branch point 21 side. Each of the first and second discharging rollers 41 and 42 has two rollers in a pair for sandwiching and conveying the sheet therebetween.

The conveying rollers 4, located before and after the scanning unit 13 in the sheet conveying direction, are referred to as conveying rollers 43 (scanning rollers).

The first drive source 61 drives the conveying rollers 43 located before and after the scanning unit 13 in the sheet conveying direction.

The second drive source 62 drives the first discharging roller 41.

The branching member 14 is located at the branch point 21 and equipped with a flapper 141. When the sheet moves from the scanning unit 13 side to the branch point 21 in the first conveying path 2, the flapper 141 automatically guides the sheet downstream in the first conveying path 2 from the branch point 21. The flapper 141 automatically guides the sheet to the second conveying path 3 side when the sheet switchbacks from the first discharging unit 15 side to the branch point 21 in the first conveying path 2.

The first discharging unit 15 is a tray receiving the sheets. The sheet is discharged from the first conveying path 2 to the first discharging unit 15. Reusable sheets without any unerased part are discharged to the first discharging unit 15 by default setting.

The second discharging unit 16 is a tray receiving the sheets. The sheet is discharged from the second conveying path 3 to the second discharging unit 16. Nonreusable sheets with an unerased part, buckling and the like are discharged to the second discharging unit 16 by default setting. By the operation of an operation input unit 18, it is possible to set the nonreusable sheets to be discharged to the first discharging unit 15 and the reusable sheets to the second discharging unit 16, contrary to the default setting.

A contact sensor or a noncontact sensor may be employed as the sensors 17, which are provided at the appropriate positions along the first conveying path 2 and the second conveying path 3 for detecting the sheet. The sensor 17 may be provided, for example, before and after the erasing unit 12 and the scanning unit 13 in the sheet conveying direction along the first conveying path 2. Hereinafter, the sensor 17 located between the scanning unit 13 and the branch point 21 along the first conveying path 2, among the sensors 17, is referred to as a first sensor 171. The sensor located between the branch point 21 and the first discharging unit 15 along the first conveying path 2 is referred to as a second sensor 172.

Figure 2:
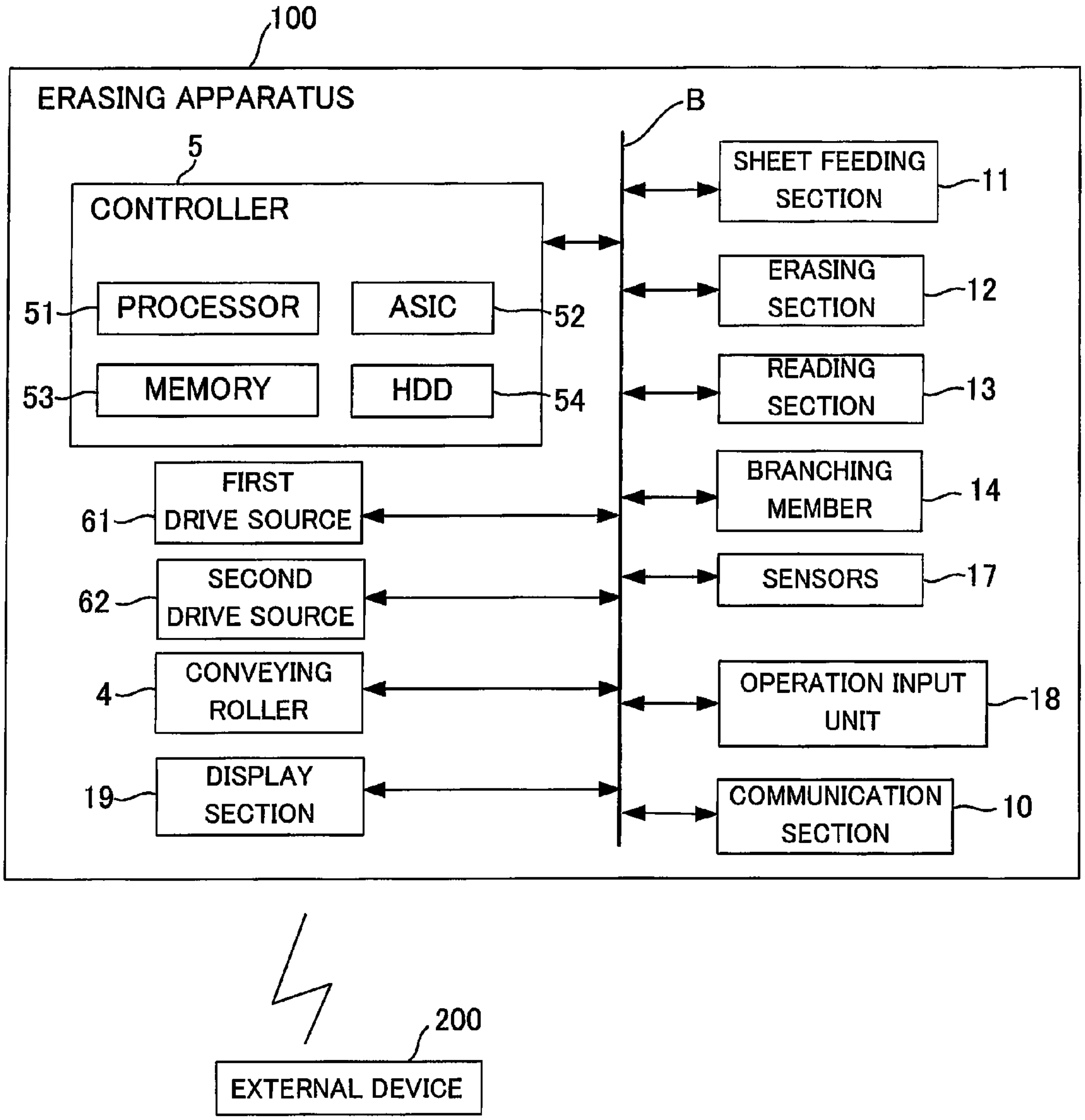
FIG. 2 is a block diagram showing the hardware structure of the erasing device.

FIG. 2 is a block diagram showing the hardware structure of the erasing device 100.

The erasing device 100 includes a controller 5 (controlling means), the operation input unit 18, a display 19, and a communication unit 10, in addition to the elements described above. The respective elements are connected via a bus B.

The controller 5 includes a processor 51, an application specific integrated circuit (ASIC) 52, the memory 53, and a HDD 54, and controls the entire erasing device 100.

The operation input unit 18 is provided with, for example, a touch panel or an operation key to receive operation inputs from a user. An operation input unit 18 gives instructions on functional operations of an erasing device 100 such as a start of decolorizing or reading of an image on a sheet to be decolorized.

The display 19 may be, for example, a touch panel, to display setting information, operation status, log information and notification to the user regarding the erasing device 100. The operation input unit 18 or a display unit 19 is not limited to the one provided inside the body of the erasing device 100, but may be so configured that it can be operated from an operation input unit of an external device 200 connected to the erasing device 100 through a network. Alternatively, the operation input unit 18 or the display unit 19 may be configured independently of the erasing device 100 and to operate the erasing device 100 by wired or wireless communication. The operation input unit 18 or the display unit 19 according to this embodiment needs only to be able to provide instructions on processing to the erasing device 100 and to browse information of the erasing device 100.

The communication unit 10 is an interface that connects with external devices. The communication unit 10 communicates with an external device 200 on a network in a wired or wireless manner.

Figure 3:
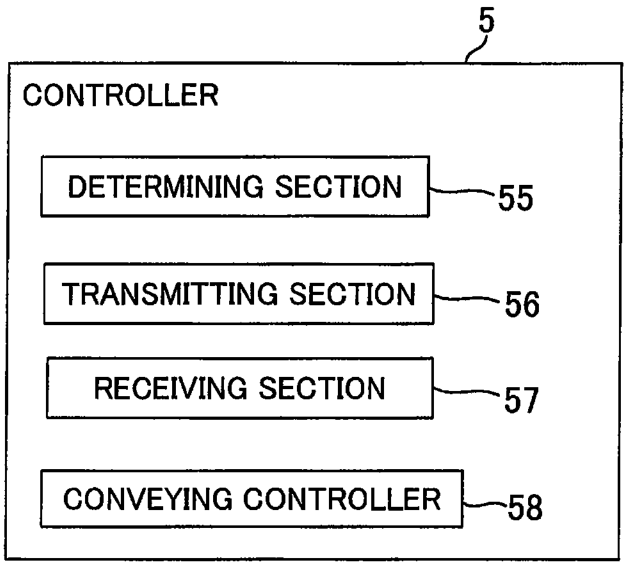
FIG. 3 is a functional block diagram of a controller.

FIG. 3 is a functional block diagram of the controller 5.

The controller 5 includes a determining section 55, a transmitting section 56, a receiving section 57, and a conveying controller 58 as functional section.

The determining section 55 performs predetermined determination processing based on the image data. According to this embodiment, the determining section 55 determines that the sheet is not reusable (not suitable for the reusable sheet) when at least one surface of the sheet has an unerased part or buckling, and determines that the sheet is reusable (suitable for the reusable sheet) when both surfaces of the sheet do not have an unerased part or buckling.

The transmitting section 56 transmits the image data to a predetermined destination (determining section 55) performing predetermined determination processing of the sheet whose image is scanned in the scanning unit 13. According to this embodiment, a determining section 55 and a transmitting section 56 are realized by, for example, independent elements each of which is mounted on a substrate.

The receiving section 57 receives determination result from the destination (determining section 55). According to this embodiment, A receiving section 57 allows a memory 53 or a HDD 54 to store determination information received from the determining section 55. The receiving section 57 is an element mounted on a substrate, and is realized by, for example, the element that is different from the elements executing function of the determining section 55 and the transmitting section 56.

The conveying controller 58 controls the respective units of the erasing device 100. The conveying controller 58 controls the conveying rollers 4 to convey the sheet. A conveying controller 58 is, for example, an element mounted on a substrate, and is realized by the same element as the one executing the function of the receiving section 57.

Figure 4:
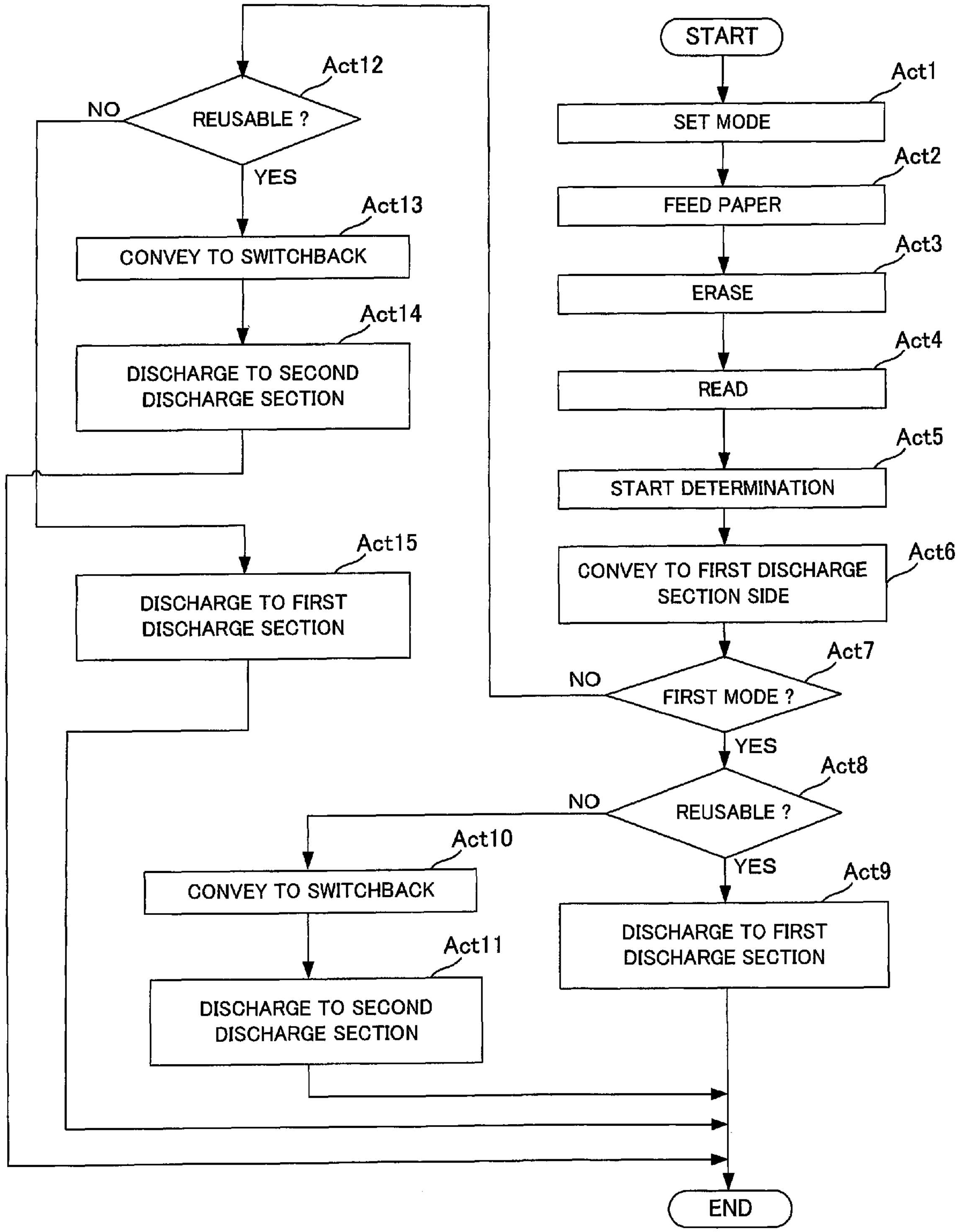
FIG. 4 is a flowchart explaining erasing processing by the erasing device.
Figure 5:
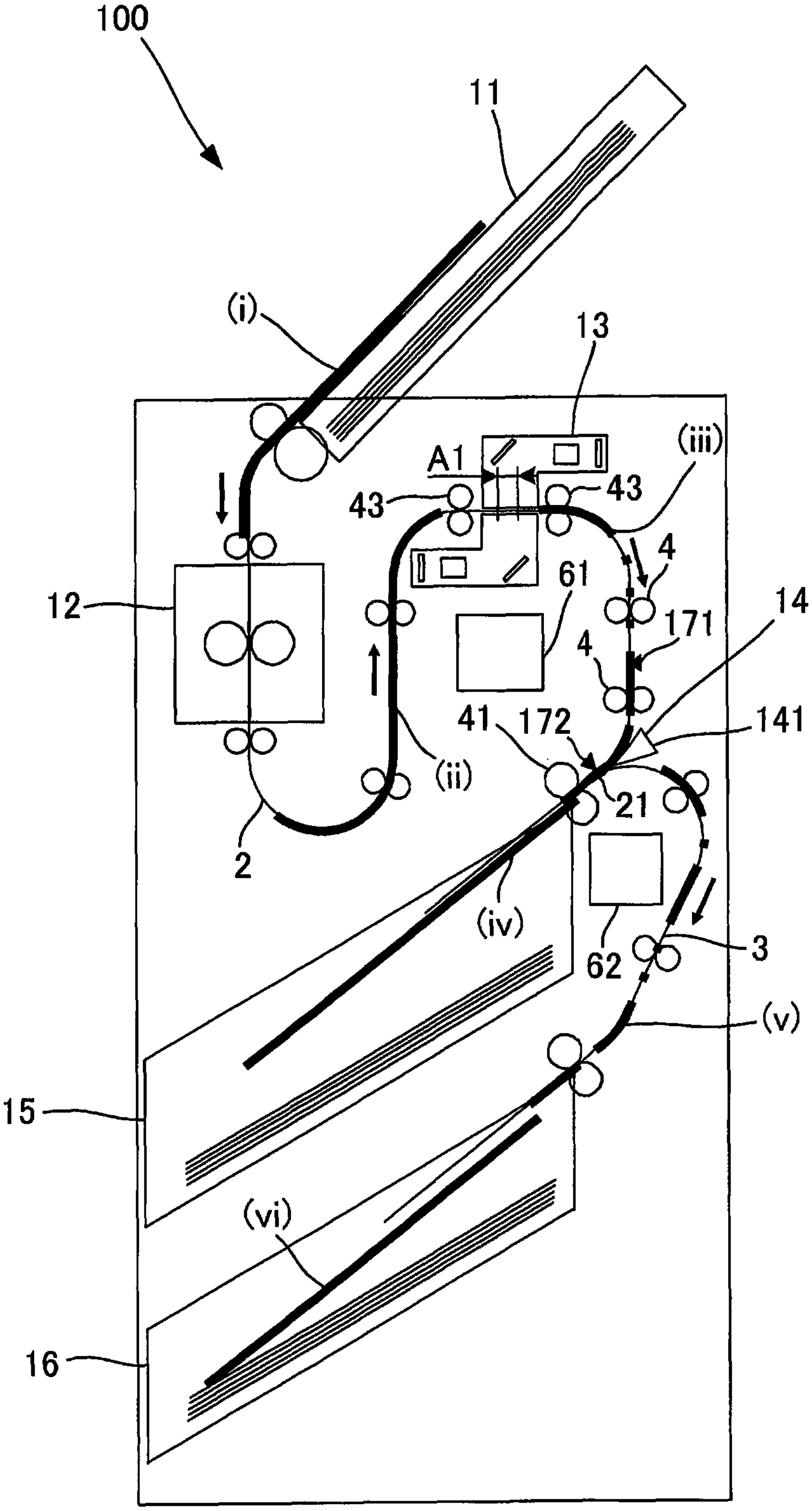
FIG. 5 is a view showing the structure of an erasing device according to a comparative example.

FIG. 4 is a flowchart explaining the erasing processing by the erasing device 100. FIG. 5 is a view showing the positions of the respective sheets in the erasing processing.

When the operation input unit 18 receives the operation inputs by the user, the controller 5 is set into a first mode or a second mode (Act 1). With the first mode, the determination information that the sheet is reusable is associated with the first discharging unit 15, and the determination information that the sheet is nonreusable is associated with the second discharging unit 16. Accordingly, the reusable sheets are discharged to the first discharging unit 15, and the nonreusable sheets are discharged to the second discharging unit 16 in the first mode. With the second mode, the determination information that the sheet is nonreusable is associated with the first discharging unit 15, and the determination information that the sheet is reusable is associated with the second discharging unit 16, contrary to the first mode. The nonreusable sheets are discharged to the first discharging unit 15, and the reusable sheets are discharged to the second discharging unit 16 in the second mode. The controller 5 is set into the first mode by the default setting.

The controller 5 (conveying controller 58) allows the paper feeding unit 11 to feed a sheet (Act 2, FIG. 5(i)), and the erasing unit 12 to erase an image on both surfaces of the sheet (Act 3, FIG. 5(ii)). The controller 5 allows the scanning unit 13 to scan the both surfaces of the sheet after erasing the image (Act 4).

The controller 5 starts determination processing whether the sheet is reusable or not based on the image data (Act 5). Specifically, the controller 5 allows the HDD54 to store the image data from the scanning unit 13 Based on the image data in the HDD 54, the controller 5 starts the determination processing whether the sheet is reusable or not. When there is no unerased part on the both surfaces, the controller 5 (the determining section 55) determines that the sheet is reusable. When there is an unerased part or buckling on at least one of the surfaces, the controller 5 determines that the sheet is nonreusable.

After scanning the sheet, the controller 5 (conveying controller 58) conveys the sheet through the branch point 21 to the first discharging unit 15 side. The sheet conveyed to the first discharging unit 15 side is conveyed to the first discharging unit 15 by the first discharging roller 41 (Act 6, FIG. 5(iii), (iv)). The determination processing by the determining section 55 is completed no later than when the sheet is fully discharged to the first discharging unit 15 by the first discharging roller 41.

When the determination information is associated with the first discharging unit 15, that is, when it is determined that the sheet is reusable according to the determination information (Act 7: YES, Act 8: YES), the controller 5 discharges the sheet to the first discharging unit 15 (Act 8).

When the determination information is associated with the second discharging unit 16, that is, when it is determined that the sheet is nonreusable according to the determination information (Act 8: NO), the controller 5 conveys the sheet to switchback. Specifically, the controller 5 discharges a part of the sheet from the first conveying path 2 to the first discharging unit 15, places an upstream end of the sheet, in the sheet conveying direction extending from the scanning unit 13 side to the first discharging unit 15 side, at a position downstream in the sheet conveying direction from the branch point 21 (FIG. 5(iv)), and conveys the sheet to switchback to the second conveying path 3 (Act 10, FIG. 5(*v*)). The controller 5 discharges the sheet in the second conveying path 3 to the second discharging unit 16 (Act 11, FIG. 5(vi)).

Now, consideration is given to an erasing device that sorts the sheet at the branch point without switchbacking the sheet. In this device, a conveying path is divided into two at a branch point, one conveying path extending to a first discharging section, the other extending to a second discharging section. With the erasing device, the distance from the scanning unit to the branch point in the sheet conveying direction is greater than the distance over which the sheet is conveyed until the determination processing is completed. Accordingly, with the erasing device, the determination processing is completed while the sheet is conveyed from the scanning unit to the branch point. With the erasing device, the sheet is sorted at the branch point to either the first discharging unit side or the second discharging unit side, based on the result of the determination processing.

Meanwhile, according to this embodiment, the downstream side in the sheet conveying direction of the first conveying path 2 is used for the switchback. According to the determination information, the controller 5 conveys the sheet to the first discharging unit 15 side until a part of the sheet is discharged to the first discharging unit 15, places the upstream end of the sheet in the sheet conveying direction at the position downstream from the branch point 21, and conveys the sheet to switchback to the second conveying path 3 side.

In other words, when the sheet is discharged to the second discharging unit 16 according to this embodiment, the sheet follows the route through which a part of the sheet is discharged to the first discharging unit 15. The distance from the scanning unit 13 to the upside of the first discharging unit 15 in the sheet conveying direction corresponds to the distance from the scanning unit to the branch point (branch position) in the erasing device 100E according to the comparative example. With this embodiment, space at the upside or the inside of the first discharging unit 15 is used as a part of the first conveying path 2 extending from the scanning unit 13 to the branch point, so that the length of the first conveying path 2 from the scanning unit 13 to the branch point can be reduced accordingly. Therefore, the height of the erasing device 100 can be reduced according to this embodiment.

When the controller 5 is set into the second mode (Act 7: NO) and it is determined that the sheet is reusable according to the determination information (Act 12: YES), the controller 5 conveys the sheet to the position where a part of the sheet is discharged to the first discharging unit 15, and conveys the sheet to switchback to the second conveying path 3 side (Act 13). Then, the controller 5 discharges the sheet to the second discharging unit 16 (Act 14). When it is determined that the sheet is nonreusable (Act 12: NO), the controller 5 discharges the sheet to the first discharging unit 15 (Act 15).

It should be noted that the controller 5 simultaneously performs processing of discharging a preceding sheet to the first discharging unit 15 (FIG. 5 (iv)), processing of conveying a succeeding sheet to the scanning unit 13 (FIG. 5(ii)), and processing of conveying a sheet from the paper feeding unit 11 to the first conveying path 2 (processing of conveying the sheet to the erasing unit 12, FIG. 5(*i*)). Further, according to this embodiment, the processing of conveying the succeeding sheet to the scanning unit 13 (FIG. 5(ii)), and the processing of conveying the sheet from the paper feeding unit 11 to the first conveying path 2 (FIG. 5(*i*)) are performed simultaneously, while the preceding sheet in the first conveying path 2 is conveyed to switchback to the second conveying path 3. According to this embodiment, three sheets are processed at the same time in the erasing device 100.

Figure 6:
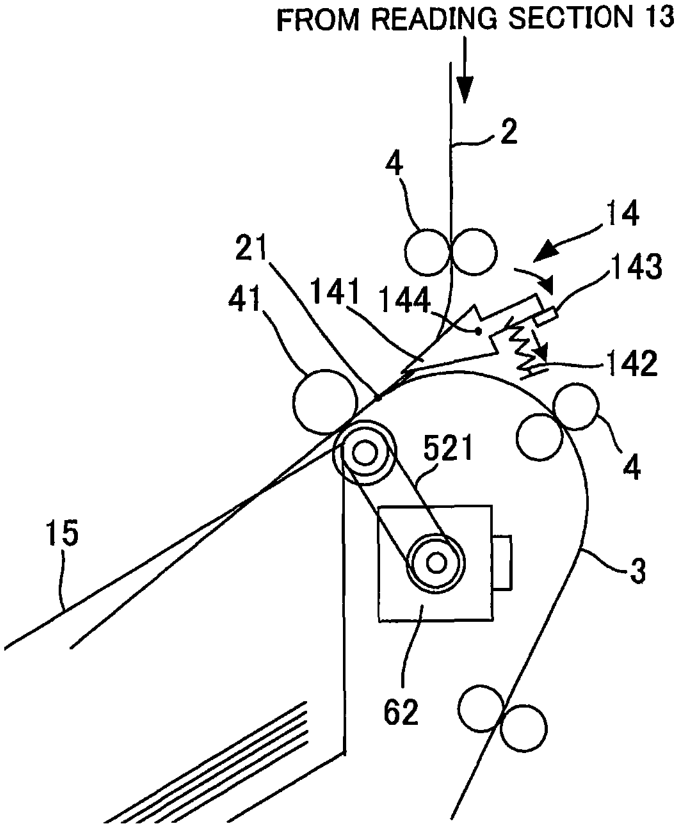
FIG. 6 is an enlarged view showing the structure of a branching member.

FIG. 6 is an enlarged view showing the structure of the first discharging roller 41 and the branching member 14.

A belt 521 is wrapped around a driving shaft of the first discharging roller 41 and a driving shaft of the second drive source 62. The belt 521 transmits a rotational driving force of the second drive source 62 to the first discharging roller 41.

The branching member 14 includes a flapper 141, a spring 142 (elastic member) and a stopper 143.

The flapper 141 has a rotating shaft 144 at its center and rotates around the rotating shaft 144. The flapper 141 is located at which a tip end thereof is directed toward the side of the first discharging unit 15. One end of the flapper 141 receives a tensile force by the spring 142 in a downward direction in FIG. 6. This allows the flapper 141 to pivot clockwise in FIG. 6, and to take a first position in which the tip as the other end of the flapper 141 is projected inside the first conveying path 2. When the flapper 141 is in the first position, the tip projects inside the first conveying path 2 and hinders the progress of the sheet moving from the scanning unit 13 side to the branch point 21. The stopper 143 is provided on the bottom of one end of the flapper 141 as in FIG. 6. The stopper 143 stops the clockwise rotation of the flapper 141 toward the first position at a predetermined position.

Figure 7:
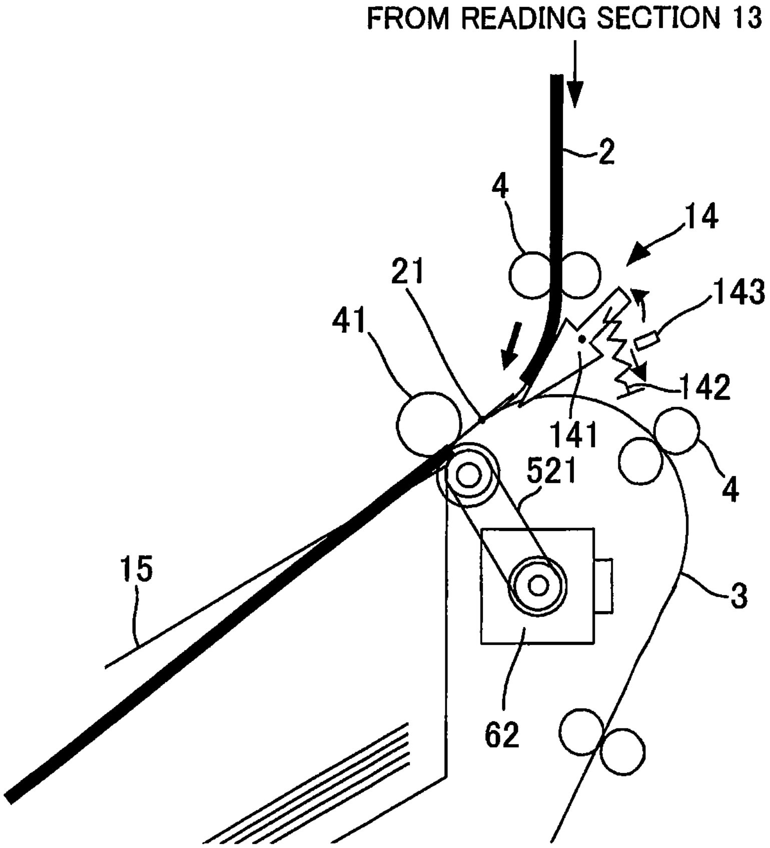
FIG. 7 is an enlarged view showing the structure of the branching member.

The elastic force by the spring 142 is extremely small. When the sheet is conveyed from the scanning unit 13 side to the first discharging unit 15 side, the flapper 141 pivots counterclockwise by being pressed by the sheet as shown in FIG. 7. And the flapper 141 changes from the first position to the second position at which the tip end thereof is located closer to a side of the second conveying path 3 than that at the first position and not hindering conveyance of the sheet. The spring 142 biases the flapper 141 with an elastic force smaller than a force of the sheet pressing the flapper 141.

Figure 8:
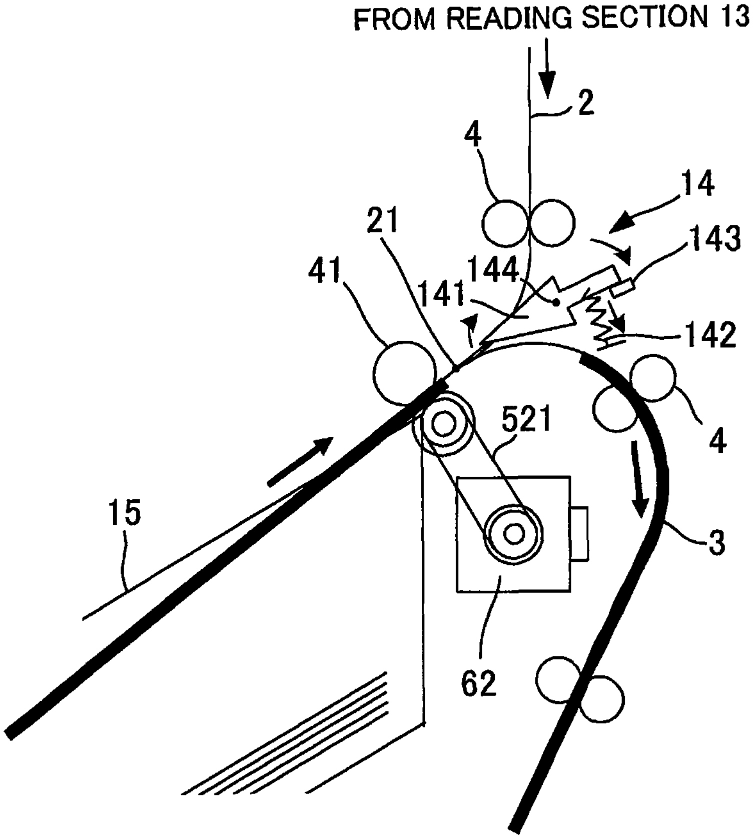
FIG. 8 is an enlarged view showing the structure of the branching member.

After the sheet passes through the branch point 21, the flapper 141 changes from the second position to the first position again by the elastic force of the spring 142, as shown in FIG. 8. When the controller 5 determines that the sheet is nonreusable, it allows the second drive source 62 to rotate backward to convey the sheet to switchback from the first discharging unit 15 side toward the branch point 21 side. At this time, the flapper 141 takes the first position, the tip end thereof projects inside the first conveying path 2 and accordingly, it guides the sheet, switchbacking from the first discharging unit 15 side to the branch point 21, to the second conveying path 3 side.

Conventionally, the branching member of a conveying device employs a tool to be used exclusively for driving the flapper, such as a solenoid. Therefore, there is a need for the technique capable of eliminating the exclusive tool, such as the solenoid, in order to avoid the cost increase.

In response to the need like this, simply conveying the sheet from the scanning unit 13 side to the first discharging unit 15 side allows the flapper 141 according to this embodiment to take the second position that does not hinder the progress of the sheet by being pressed by the sheet. The flapper 141 is back to the first position, in which the flapper projects inside the first conveying path 2, by the elastic force of the spring after the sheet passes therethrough, and therefore the sheet can be sorted to the second conveying path 3 side when the sheet is conveyed to switchback to the branch point 21. Thus, according to this embodiment, it is possible to automatically and appropriately drive the flapper 141 without the exclusive tool such as the solenoid, so that the cost reduction can be realized.

It should be noted that, when the conventional technique for driving the conveying rollers is applied to this embodiment, the discharging roller and the conveying rollers on the scanning unit side are driven to the identical direction by the identical drive source. According to the conventional technique for driving the conveying roller, it is impossible to convey the succeeding sheet to the scanning unit 13 while conveying the preceding sheet to switchback from the first discharging unit side to the branch point 21 side. According to the conventional technique for driving the conveying roller, it is necessary to temporarily convey the preceding sheet to switchback from the first discharging unit 15 side to the branch point 21 side, and then convey the succeeding sheet to the scanning unit 13. Thus, when the conventional technique for driving the conveying roller is applied to this embodiment, there is a problem of slow processing speed.

In view of the problem like this, the first drive source 61 (FIG. 1) for driving the conveying rollers 43 on the scanning unit 13 side, and the second drive source 62 for driving the first discharging roller 41 are separately provided according to this embodiment. Therefore, the conveying rollers 43 on the scanning unit 13 side and the first discharging roller 41 can be driven in the reverse directions at the same time, according to this embodiment. Accordingly, the succeeding sheet can be conveyed to the scanning unit 13 while the preceding sheet is conveyed to switchback from the first discharging unit 15 side to the branch point 21 side, so that the processing time can be reduced.

The flapper 141 may be configured to use gravity to take the first position at which the tip end thereof projects inside the carrying path 2. For example, the flapper 141 may be configured to be heavier on the right side of the rotating shaft 144 than on the left side of the rotating shaft 144. In this case, when the sheet moves from the scanning unit 13 side to the branch point 21, the flapper 141 pivots counterclockwise by being pressed by the sheet, to take the first position that does not hinder the progress of the sheet. When the sheet passes through the branch point 21, the flapper 141 pivots clockwise again by its own weight, and returns to the first position projecting inside the first conveying path 2. When the sheet is conveyed to switchback from the first discharging unit 15 side to the branch point 21, the flapper 141 thus guides the sheet to the second conveying path 3 side.

Figure 9:
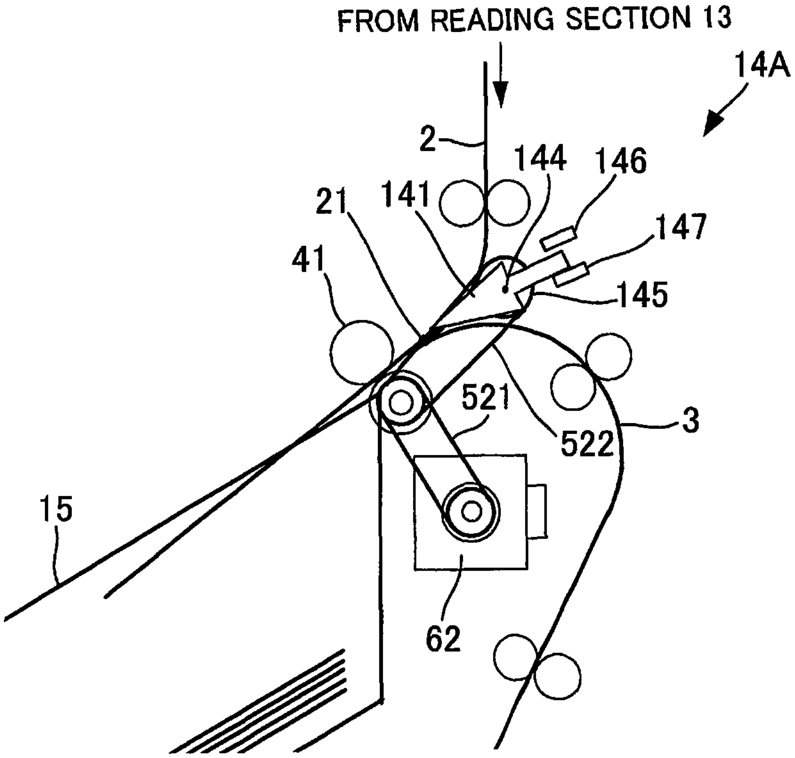
FIG. 9 is an enlarged view showing the structure of another branching member.

FIG. 9 is an enlarged view showing the structure of another branching member 14A.

The branching member 14A is different from the branching member 14 shown in FIG. 8 in that a belt 522 is wrapped around a pulley 145, provided on the rotating shaft 144 of the flapper 141, and the driving shaft of the first discharging roller 41. Rotational driving forces in the different directions are transmitted to the flapper 141, so that the flapper 141 changes between a third position (FIG. 10) that does not hinder the progress of the sheet moving from the scanning unit 13 side to the branch point 21 in the first conveying path 2, and a fourth position that guides the sheet, moving from the first discharging unit 15 side to the branch point 21, to the second conveying path 3 side, as shown in FIG. 9.

Stoppers 146 and 147 are provided above and below one end of the flapper 141 as shown in FIG. 9.

When the flapper 141 takes the third position by pivoting counterclockwise in FIG. 9 not hindering the progress of the sheet moving from the scanning unit 13 side, its pivotal movement is stopped by the stopper 146 (first stopper). When the flapper 141 takes the fourth position by pivoting clockwise in FIG. 9 to guide the sheet, moving from the first discharging unit 15 side, to the second conveying path 3, its pivotal movement is stopped by the stopper 147 (second stopper).

A clutch to cut the rotational driving force transmitted to the flapper 141, when the rotational movement of the flapper 141 is stopped by the stoppers 146, 147, is provided between the flapper 141 and the driving shaft of the first discharging roller 41. For example, the pulley 145 may contain the clutch. When the rotational movement of the flapper 141 is stopped, the pulley 145 slides on the rotating shaft 144 of the flapper 141 so as not to add a force of a predetermined value or more to the flapper 141.

Figure 10:
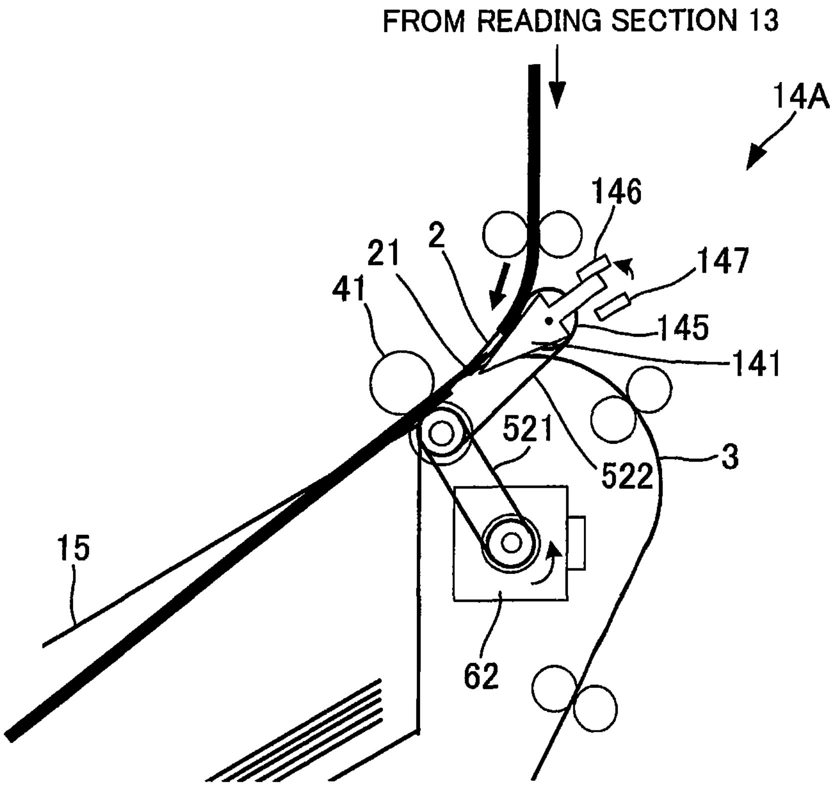
FIG. 10 is an enlarged view showing the structure of the branching member.

When the sheet is conveyed from the scanning unit 13 side to the branch point 21 side, as shown in FIG. 10, the controller 5 rotationally drives the driving shaft of the second drive source 62 counterclockwise in FIG. 10. The flapper 141 rotates counterclockwise in FIG. 10 by the driving force transmitted from the second drive source 62 through the belts 521, 522, and takes the third position that does not hinder the progress of the sheet moving from the scanning unit 13 side. Thereby, the sheet passes through the branch point 21 without being hindered by the flapper 141.

Figure 11:
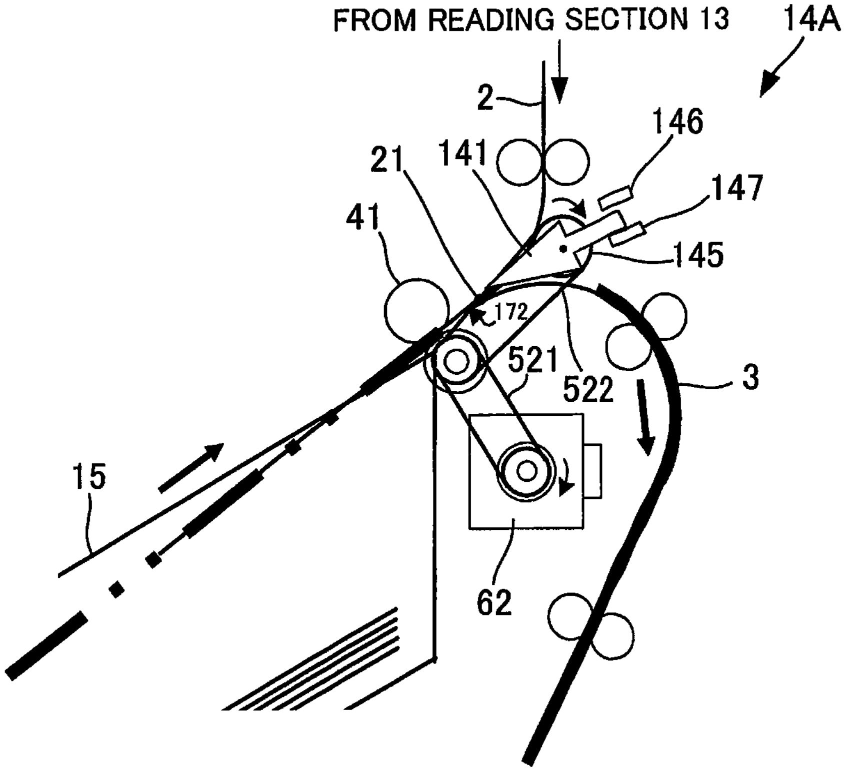
FIG. 11 is an enlarged view showing the structure of the branching member.

When it is determined that the sheet is nonreusable and the sensor 172 senses that the upstream end of the sheet in the sheet conveying direction passes through the branch point 21, the controller 5 drives the second drive source 62 clockwise in FIG. 11 and conveys the sheet to switchback to the branch point 21 by the first discharging roller 41. Here, the flapper 141 pivots clockwise in FIG. 12 by the driving force transmitted through the belts 521, 522, and takes the fourth position that guides the sheet, moving from the first discharging unit 15 side, to the second conveying path 3 side. The flapper 141 guides the sheet, switchbacking from the first discharging unit 15 side to the branch point 21, to the second conveying path 3 side.

(Second Embodiment)

Figure 12:
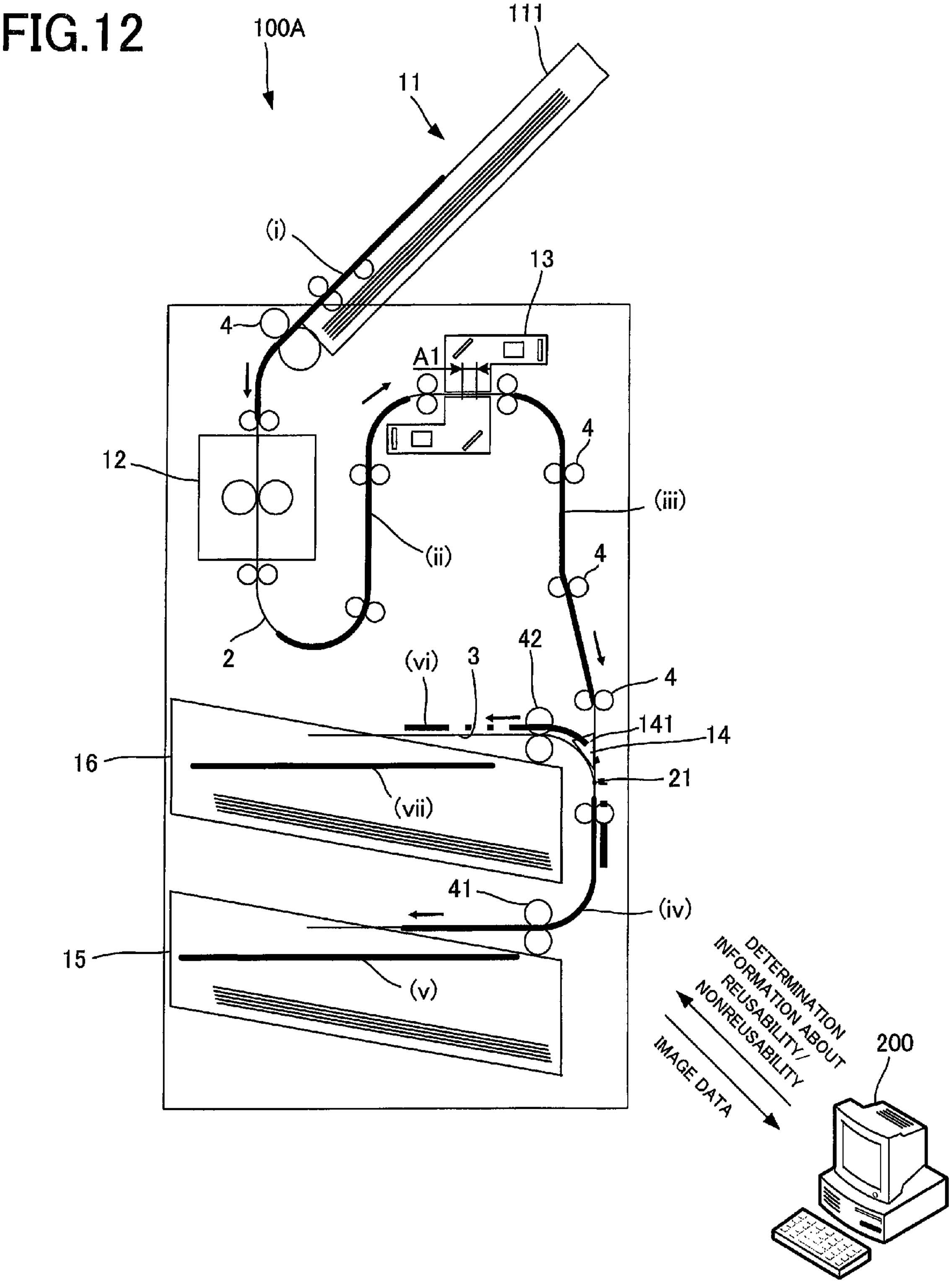
FIG. 12 is a view showing the structure of an erasing device according to a second embodiment.

FIG. 12 is a view showing the structure of an erasing device 100A.

According to this embodiment, the erasing device 100A performs erasing processing by communicating with an external device 200 such as a personal computer (PC) to use processing capacity of the external device 200. The external device 200 includes a processor, an ASIC, a memory, and a HDD. The external device 200 receives image data on both surfaces of a predetermined sheet from the erasing device 100A and determines whether the sheet is reusable or not based on the image data. According to this embodiment, the external device 200 functions as the determining section for determining whether the sheet is reusable or not. A communication unit 10 of the erasing device 100A for transmitting/receiving the image data to/from the external device 200 functions as the transmitting section for transmitting the image data to the determining section. The communication unit 10 of the erasing device 100A functions as the receiving section for receiving determination information whether the sheet is reusable or not from the external device 200.

A first conveying path 2 extends downward from a scanning unit 13 side, bends to the side (leftward) in FIG. 12 and reaches a first discharging unit 15. A branching member 14 includes a flapper 141 and a solenoid drivingly rotating the flapper 141. The distance from a scanning region A1 of the scanning unit 13 to the branching member 14 in sheet conveying direction is greater than the length in the sheet conveying direction of an A4-R sheet, having the greatest length in the sheet conveying direction among the sheets to be erased.

Figure 13:
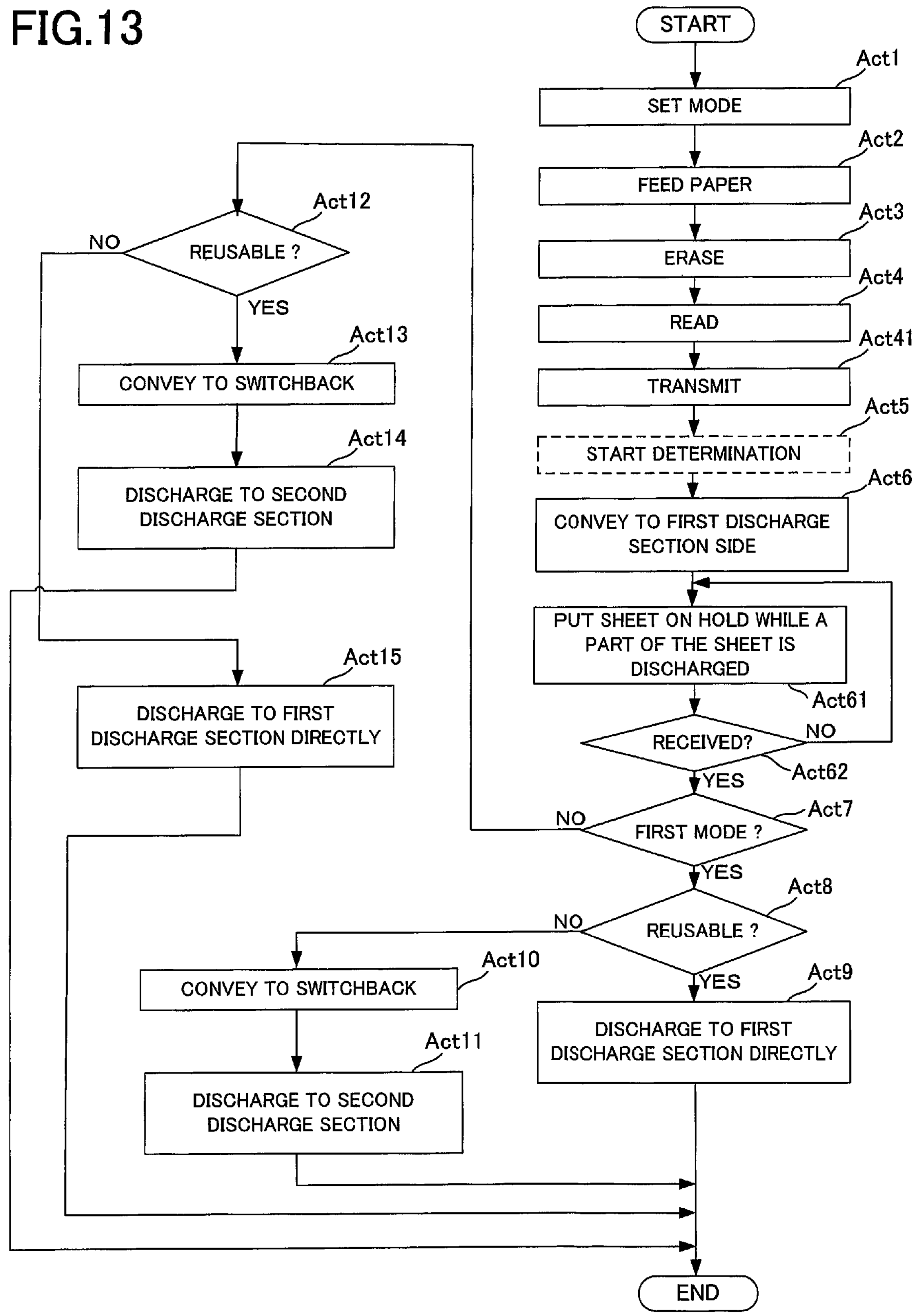
FIG. 13 is a flowchart explaining the erasing processing by the erasing device.

Hereinafter, the erasing processing of the erasing device 100A is briefly explained with reference to a flowchart in FIG. 13.

According to this embodiment, a controller 5 is set into a first mode in which the reusable sheet is discharged to the first discharging unit 15 (Act 1).

The controller 5 allows a paper feeding unit 11 to feed a sheet (Act 2, FIG. 12(i)), and an erasing unit 12 to erase an image on both surfaces of the sheet (Act 3, FIG. 12(ii)). The controller 5 allows the scanning unit 13 to scan the both surfaces of the sheet after erasing the image, and a memory 53 to store the scanned image data (Act 4, FIG. 12(iii)). The controller 5 transmits the image data in the memory 53 to the external device 200 through the communication unit 10 (Act 41).

The external device 200 receives the image data and starts determination processing whether the sheet is reusable or not based on the image data (Act 5) and, when the determination of reusability/nonreusability is completed, transmits the determination information to the erasing device 100A.

After scanning the sheet, the controller 5 conveys the sheet through a branch point 21 to the first discharging unit 15 side (Act 6). The controller 5 allows a discharging roller 41 to put the sheet on hold while a part of the sheet is discharged to the first discharging unit 15 side (Act 61, FIG. 12(iv)).

At the same time when the sheet is on hold on the first discharging unit 15 side, the controller 5 allows the scanning unit 13 to scan the both surfaces of the succeeding sheet, and puts the succeeding sheet on hold before the branch point 21 (FIG. 12(iii)).

The reason why the succeeding sheet is on hold before the branch point 21 is that, when it is necessary to discharge the preceding sheet to the second discharging unit 16, the succeeding sheet cannot be moved to the first discharging unit 15 side from the branch point 21, until the preceding sheet is conveyed to switchback from the first discharging unit 15 side to the second conveying path 3 side.

While the processing steps of the sheets are on hold, the communication unit 10 receives the determination information from the external device 200 about reusability/nonreusability (Act 62: YES). When the sheet is determined to be reusable according to the determination information (Act 7: YES, Act 8: YES), the controller 5 discharges the preceding sheet to the first discharging unit 15 directly (Act 9: YES, FIG. 12(*v*)). Simultaneously with discharging the preceding sheet to the first discharging unit 15, the controller 5 moves the succeeding sheet that is put on hold before the branch point 21 (FIG. 12(iii)) to the first discharging unit 15 side, and puts the sheet on hold until the reception of the determination information of the succeeding sheet (FIG. 12(iv)). The controller 5 moves the respective sheets that are put on hold before the respective processing units 12, 13 (FIG. 12 (i), (ii)) to the next steps (scanning processing, erasing processing).

Thus, the sheet is put on hold just before the first discharging unit 15, from which the sheets are discharged more often, according to this embodiment. Therefore, it is possible to discharge the sheet to the first discharging unit 15 immediately after receiving the determination information in many cases. As compared with the case where the first sheet is put on hold every time at the position upstream in the sheet conveying direction from the branch point 21, it is possible to reduce processing time after receiving the determination information of the sheet, and to reduce total time for the erasing processing, accordingly.

When the sheet is determined to be nonreusable according to the determination information (Act 8: NO), the controller 5 conveys the sheet to switchback from the position where the sheet is put on hold on the first discharging unit 15 side to a second conveying path 3 side (Act 10, FIG. 12(vi)), and then, discharges the sheet to a second discharging unit 16 (Act 11, FIG. 4(vii)). The controller 5 moves the succeeding sheets, being on hold, to the next steps, simultaneously with discharging the sheet to the second discharging unit 16.

It is impossible for the erasing device 100A to stop the conveyance of the sheets during the erasing processing and the scanning processing in order to secure erasing quality, safety, and scanning quality. Therefore, space for putting the sheet on hold is provided in the erasing device 100A before and after the erasing unit 12 and the scanning unit 13, as described above. The sheet that is put on hold at this space moves to the next space every time the preceding sheet is discharged to either one of the discharging units 15 and 16.

According to this embodiment, four sheets (FIG. 12 (i) to (vi)) are processed at the same time in the erasing device 100A.

(Third Embodiment)

Figure 14:
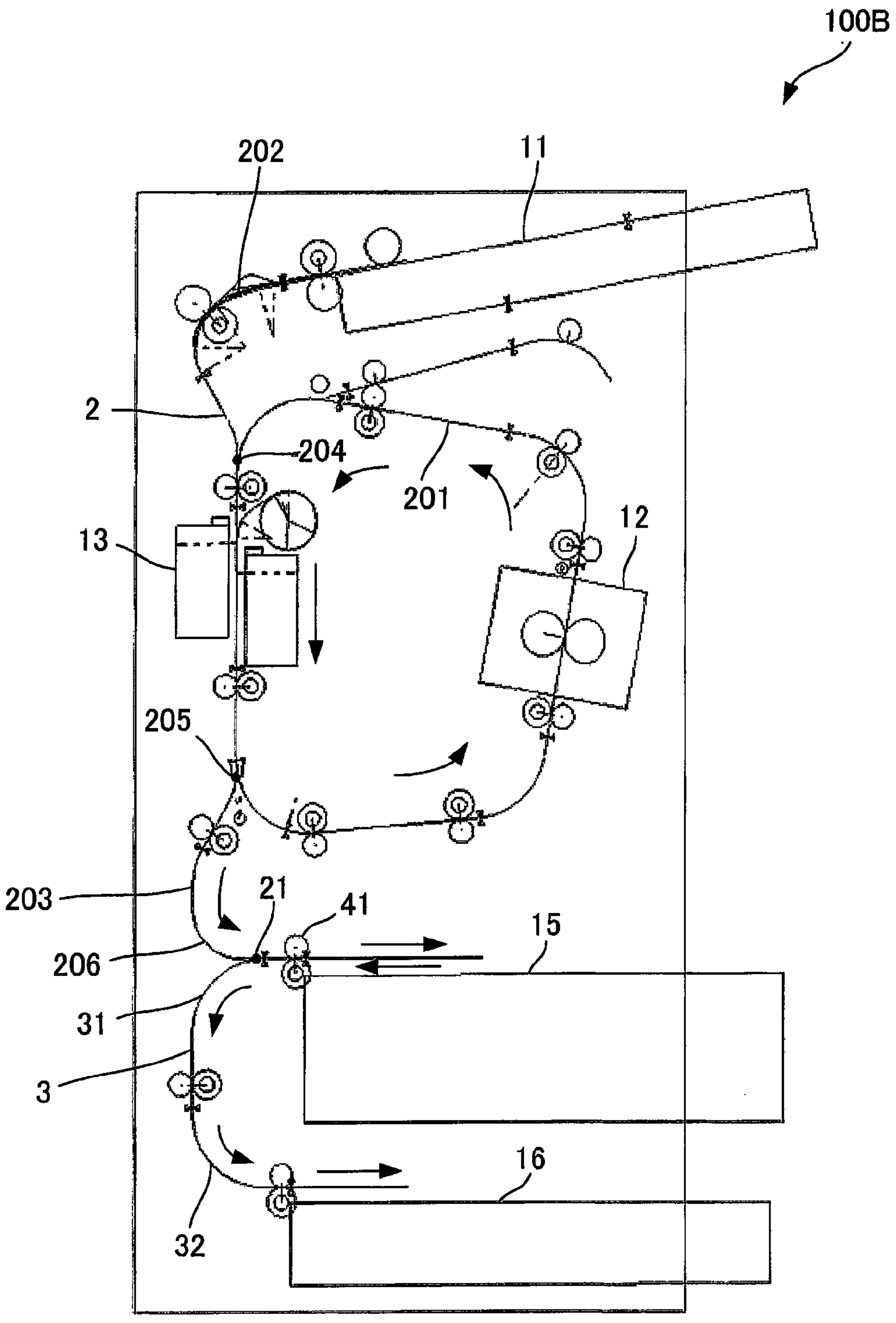
FIG. 14 is a view showing the structure of an erasing device according to a third embodiment.

FIG. 14 is a view showing the structure of an erasing device 100B.

A first conveying path 2 extending from a paper feeding unit 11 to a first discharging unit 15 has a annular conveying path 201, a third conveying path 202 that extends from the paper feeding unit 11 to the annular conveying path 201, and a fourth conveying path 203 that extends from the annular conveying path 201 to the first discharging unit 15. A scanning unit 13 and an erasing unit 12 are provided along the annular conveying path 201. The annular conveying path 201 has a connection point 204 connected with the third conveying path 202, and a connection point 205 connected with the fourth conveying path 203.

A controller 5 feeds a sheet from the paper feeding unit 11, conveys the sheet to the annular conveying path 201, and allows the scanning unit 13 to scan both surfaces of the sheet. Image data obtained by the scanning unit 13 is stored in a memory 43. After the scanning processing of the sheet by the scanning unit 13, the controller 5 allows the erasing unit 12 to perform decolorizing processing of the both surfaces of the sheet. Thereafter, the controller 5 allows the scanning unit 13 to scan the both surface of the sheet again. Based on the image data, the controller 5 starts determination about reusability/nonreusability. The controller 5 conveys the sheet to the first discharging unit 15 side.

When the controller 5 determines that the sheet is reusable, it discharges the sheet to the first discharging unit 15. When the controller 5 determines that the sheet is nonreusable, it conveys the sheet to switchback to a second conveying path 3 side, and discharges the sheet to a second discharging unit 16.

It should be noted that the fourth conveying path 203 has a first bending portion 206 on a branch point 21 side. The second conveying path 3 has a second bending portion 31 on the branch point 21 side, and a third bending portion 32 on the second discharging unit 16 side.

At the branch point 21, the first bending portion 206 and the second bending portion 31 are joined to each other, the first bending portion 206 being at a position upstream in sheet conveying direction from the branch point 21 of the first conveying path 2, extending from the scanning unit 13 side to the first discharging unit 15 side, the second bending portion 31 being at a position downstream in the sheet conveying direction of the second conveying path 3 from the branch point 21.

A radius of curvature R2 of the second bending portion 31 is greater than a radius of curvature R1 of the first bending portion 206. The radius of curvature R1 of the first bending portion 206 is made smaller because the sheet that is heated during the erasing processing still keeps a high temperature at the first bending portion 206, and therefore jamming of the sheet is hardly caused even though the radius of curvature R1 is small to a certain extent. Further, the smaller radius of curvature R1 reduces the height of the device and contributes to space saving.

Meanwhile, the second bending portion 31 is a path after switchback conveyance, and the sheet passing through the second bending portion 31 may be cooled and curled due to the passage of time after passing through the first bending portion 206. The jamming of the sheet may be caused at the second bending portion 31 easier than at the first bending portion 206, and therefore the radius of curvature R2 of the second bending portion 31 is made greater than the radius of curvature R1 of the first bending portion 206.

A radius of curvature R3 of the third bending portion 32 is greater than the radius of curvature R1 of the first bending portion 206, and preferably equal to or greater than the radius of curvature R2 of the second bending portion 31. When the sheet reaches the third bending portion 32, the sheet may be cooled and curled much more as compared with the sheet at the second bending portion 31. Accordingly, the radius of curvature R3 of the third bending portion 32 should be not less than the radius of curvature R1 of the first bending portion 206, and preferably, equal to or greater than the radius of curvature R2 of the second bending portion 31.

A discharging roller 41 includes a pair of rollers opposing to each other, and conveys the sheet to switchback to the second bending portion 31 while supporting the sheet at one point. This makes it possible to reduce the tensility of the sheet during conveyance, as compared with the case where the sheet is supported at a plurality of points. According to this embodiment, the sheet can be curved along the surface of a wall of the second bending portion 31 even if the sheet is curled, and the jamming of the sheet in the second bending portion 31 can be prevented.

Consideration is given to the erasing device 100B so configured that it can be set into a scanning mode for performing only the scanning of the image on the sheet. When setting the erasing device 100B configured like this into the scanning mode, it is necessary for a user to select the first discharging unit 15 or the second discharging unit 16 for discharging the scanned sheet, which causes a problem that the setting is troublesome.

In response to the problem like this, according to this embodiment, it is possible to set the controller 5 into the scanning mode that performs only the scanning processing by operation inputs into the operation input unit 18. The controller 5 is set in advance to discharge the sheet to either the first discharging unit 15 or the second discharging unit 16, when it is set into the scanning mode. Hereinafter, the method for setting the discharging destination of the scanned sheet is explained with reference to FIG. 14.

First, the total of radiuses of curvature of curved portions in the first conveying path 2 from the branch point 21 to the first discharging unit 15 is compared with the total of radiuses of curvature of curved portions in the second conveying path 3. When the total of the radiuses of curvature of the curved portions in the first conveying path 2 from the branch point 21 to the first discharging unit 15 is smaller, the first discharging unit 15 is set to be the discharging destination of the scanned sheet. When the total of the radiuses of curvature of the curved portions in the second conveying path 3 is smaller, the second discharging unit 16 is set to be the discharging destination of the scanned sheet.

According to this embodiment, as shown in FIG. 14, the total of the radiuses of curvature of the curved portions in the first conveying path 2 from the branch point 21 to the first discharging unit 15 is zero, and the total of the radiuses of curvature of the curved portions in the second conveying path 3 has some values, and therefore the first discharging unit 15 is set to be the discharging destination of the scanned sheet. Thus, it is possible to allow the sheet to pass through the path with less sharp curves to be discharged to the discharging unit, and to prevent jamming of the sheet.

It should be noted that, when the total of the radiuses of curvature of the curved portions from the scanning unit 13 to the first discharging unit 15 is smaller than the total of the radiuses of curvature of the curved portions from the scanning unit 13 to the second discharging unit 16, it is possible to set the first discharging unit 15 as the discharging destination of the sheet. Also, when the total of the radiuses of curvature of the curved portions from the scanning unit 13 to the first discharging unit 15 is greater than the total of the radiuses of curvature of the curved portions from the scanning unit 13 and to second discharging unit 16, it is possible set the second discharging unit 16 as the discharging destination of the sheet.

Any form of a storage medium may be employed as long as a program can be stored therein and a computer can read the storage medium. Specific examples of the storage medium include, for example, internal memory installed in the computer such as ROM and RAM, a transportable storage medium including a CD-ROM, a flexible disk, a DVD disk, a magneto-optical disk, an IC card or and the like, a database having a computer program, or other computers and databases. Functions obtained by installation and downloading can be realized together with an OS inside the device. A part of or the entire program may be a dynamically-generated execution module.

The order of the processing steps in each embodiment may be different from the order explained in each embodiment.

As described in detail thus far, the technique of reducing the size of the sheet sorting device can be provided according to the embodiments described herein.

What is claimed is:

1. A device comprising:

a paper feeding unit configured to feed a sheet;

a reading unit configured to read an image on the sheet;

a first discharging unit to which the sheet is discharged;

a second discharging unit to which the sheet is discharged and which is different from the first discharging unit;

a first conveying path that extends from the reading unit to the first discharging unit and along which the sheet is conveyed to the first discharging unit without switchback conveyance;

a second conveying path branched from the first conveying path at a branch point of the first conveying path and extending to the second discharging unit to provide a switchback conveyance path of the sheet from a side of the first discharging unit to the second discharging unit;

a branching member located at the branch point to direct the sheet that moves from the side of the first discharging unit to the branch point to the second conveying path; and a conveying member located between the first discharging unit and the branching member, the conveying member being configured to:

discharge the sheet to the first discharging unit if a discharging destination of the sheet is the first discharging unit, and if the discharging destination of the sheet is the second discharging unit, to make part of the sheet project from the conveying member towards the first discharging unit, to convey the sheet until an upstream tip end of the sheet in a sheet conveying direction from a side of the reading unit to the side of the first discharging unit is located at a position downstream in the sheet conveying direction from the branch point, and to convey the sheet from the side of the first discharging unit to the second conveying path through the branching member, wherein a distance from the branch point to the conveying member in the first conveying path is smaller than a length of the sheet in the sheet conveying direction.

2. The device according to claim 1, further comprising:

a controller configured to acquire determination information whether the sheet is reusable, the information being generated on the basis of image data read at the reading unit, and to select the discharging destination of the sheet from the first discharging unit and the second discharging unit on the basis of the determination information.

3. The device according to claim 2, wherein the controller determines whether the sheet is reusable on the basis of the image data read by the reading unit, and to select the discharging destination of the sheet from the first discharging unit and the second discharging unit.

4. The device according to claim 3, wherein the second discharging unit is located below the first discharging unit, and the controller discharges a reusable sheet to the first discharging unit and a non-reusable sheet to the second discharging unit.

5. The device according to claim 4, wherein
the first conveying path has a first bending portion located at a position upstream of the branch point in the sheet conveying direction, and
the second conveying path has a second bending portion branched from the first conveying path at the branch point, formed toward the second discharging unit located below the first discharging unit, and having a radius of curvature greater than a radius of curvature of the first bending portion.

6. The device according to claim 5, wherein
the conveying member includes a pair of rollers configured to discharge the sheet to the first discharging unit when the discharging destination of the sheet is the first discharging unit, and to convey the sheet from the side of the first discharging unit to the second bending portion while supporting the sheet at one point when the discharging destination of the sheet is the second discharging unit.

7. The device according to claim 2, further comprising:
an operation input unit configured to receive an operation input from a user, and
wherein, based on the operation input from the user,
the controller sets either
a first mode in which a reusable sheet is discharged to the first discharging unit and a non-reusable sheet is discharged to the second discharging unit, or
a second mode in which the non-reusable sheet is discharged to the first discharging unit and the reusable sheet is discharged to the second discharging unit.

8. The device according to claim 2, wherein
the controller causes the conveying member to make part of the sheet project from the conveying member to the first discharging unit, when the sheet whose image is read by the reading unit passes through the branch point before the determination information is acquired, and to suspend the conveyance of the sheet until the determination information is acquired and the discharging destination of the sheet is determined.

9. The device according to claim 1, wherein the conveying member includes a switchback roller configured to convey the sheet from the side of the first discharging unit side to the branch point, and
wherein the device further comprises:
a reading roller located before and after the reading unit in the sheet conveying direction,
a first drive source to drive the reading roller, and
a second drive source to drive the switchback roller, the second drive source being different from the first drive source.

10. The device according to claim 1, wherein
the branching member includes a flapper and an elastic member, the flapper pivoting to change between a first position at which a tip end thereof is directed toward the side of the first discharging unit and projected into the first conveying path and a second position at which the tip end thereof is located closer to a side of the second conveying path than that at the first position and not hindering conveyance of the sheet conveyed from the reading unit toward the branch point in the first conveying path, wherein
the flapper, which changes from the first position to the second position by being pressed by the sheet conveyed from the reading unit, in the first position guides the sheet conveyed from the side of the first discharging unit to the branch point by the conveying member, to the second conveying path, and wherein
the elastic member biases the flapper with an elastic force smaller than a force of the sheet pressing the flapper, and changes the flapper from the second position to the first position when the sheet conveyed from the reading unit passes through the flapper.

11. The device according to claim 1, further comprising:
an erasing unit configured to erase the image on the sheet, and wherein
the reading unit reads the image on the sheet after being erased by the erasing unit.

12. The device according to claim 11, wherein the erasing unit erases the image on the sheet by heating the sheet.

13. A method for sorting sheets by a device, the device including: a paper feeding unit configured to feed a sheet, a reading unit, a first discharging unit to which the sheet is discharged, a second discharging unit to which the sheet is discharged and which is different from the first discharging unit, a first conveying path that extends from the reading unit to the first discharging unit and along which the sheet is conveyed to the first discharging unit without switchback conveyance, a second conveying path branched from the first conveying path at a branch point of the first conveying path and extending to the second discharging unit to provide a switchback conveyance path of the sheet from a side of the first discharging unit to the second discharging unit, a branching member located at the branch point, a conveying member located between the first discharging unit and the branching member, a plurality of conveying rollers, a transmitting section, and a receiving section, the method comprising:
causing the reading unit to read an image on the sheet;
causing the transmitting section to transmit image data read by the reading unit to a predetermined destination to perform predetermined determination processing of the sheet whose image is read by the reading unit;
causing the receiving section to receive determination information of the predetermined determination processing from the predetermined destination;
selecting a discharging destination of the sheet from the first discharging unit and the second discharging unit on the basis of the determination information;
causing the conveying rollers to convey the sheet whose image is read by the reading unit to a side of the first discharging unit in the first conveying path;
if the discharging destination of the sheet is the first discharging unit, causing the conveying member to discharge the sheet to the first discharging unit; and
if the discharging destination of the sheet is the second discharging unit, causing the conveying member to make part of the sheet project from the conveying member towards the first discharging unit, to convey the sheet until an upstream tip end of the sheet in a sheet conveying direction from a side of the reading unit to the side of the first discharging unit is located at a position downstream in the sheet conveying direction from the branch point, and to convey the sheet from the side of the first discharging unit to the second conveying path through the branching member, wherein
a distance from the branch point to the conveying member in the first conveying path is smaller than a length of the sheet in the sheet conveying direction.

14. The method according to claim 13, wherein
the determination information received from the predetermined destination is determination information whether the sheet is reusable or not, the information being generated on the basis of the image data read by the reading unit.

15. The method according to claim 14, wherein the second discharging unit is located below the first discharging unit, and the method comprises discharging a reusable sheet to the first discharging unit and a non-reusable sheet to the second discharging unit.

16. A device comprising:

a paper feeding means for feeding a sheet;

a reading means for reading an image on the sheet;

a first discharging unit to which the sheet is discharged;

a second discharging unit to which the sheet is discharged and which is different from the first discharging unit;

a first conveying path that extends from the reading means to the first discharging unit and along which the sheet is conveyed to the first discharging unit without switch-back conveyance;

a second conveying path branched from the first conveying path at a branch point of the first conveying path and extending to the second discharging unit to provide a switchback conveyance path of the sheet from a side of the first discharging unit to the second discharging unit;

a branching means located at the branch point for directing the sheet that moves from the side of the first discharging unit to the branch point to the second conveying path; and a conveying means located between the first discharging unit and the branching means, the conveying means for;

discharging the sheet to the first discharging unit if a discharging destination of the sheet is the first discharging unit, and if the discharging destination of the sheet is the second discharging unit, making part of the sheet project from the conveying member towards the first discharging unit, conveying the sheet until an upstream tip end of the sheet in a sheet conveying direction from a side of the reading means to the side of the first discharging unit is located at a position downstream in the sheet conveying direction from the branch point, and conveying the sheet from the side of the first discharging unit to the second conveying path through the branching means, wherein a distance from the branch point to the conveying member in the first conveying path is smaller than a length of the sheet in the sheet conveying direction.

17. The device according to claim 16, further comprising:

a controlling means for acquiring determination information whether the sheet is reusable or not, the information being generated on the basis of image data read at the reading unit, and selecting the discharging destination of the sheet from the first discharging unit and the second discharging unit on the basis of the determination information.

18. The device according to claim 17, wherein the controlling means determines whether the sheet is reusable or not on the basis of the image data read by the reading means, and selects the discharging destination of the sheet from the first discharging unit and the second discharging unit.

19. The device according to claim 16, wherein the second conveying path has a second bending portion branched from the first conveying path at the branch point, formed toward the second discharging unit located below the first discharging unit, and having a radius of curvature greater than a radius of curvature of the first bending portion, and the conveying means includes a pair of rollers configured to discharge the sheet to the first discharging unit when the discharging destination of the sheet is the first discharging unit, and to convey the sheet from the side of the first discharging unit to the second bending portion while supporting the sheet at one point when the discharging destination of the sheet is the second discharging unit.

* * * * *